Sept. 28, 1965   R. A. TRENTHAM ETAL   3,208,622
DOUBLE-WALLED CONTAINER
Original Filed Sept. 5, 1957

INVENTORS
RALPH A. TRENTHAM
ROBERT F. O'CONNELL
BY William J. Mosinger
ATTORNEY

United States Patent Office 3,208,622
Patented Sept. 28, 1965

3,208,622
DOUBLE-WALLED CONTAINER
Ralph A. Trentham and Robert F. O'Connell, Indianapolis, Ind., assignors to Union Carbide Corporation, a corporation of New York
Continuation of application Ser. No. 682,104, Sept. 5, 1957. This application Oct. 1, 1962, Ser. No. 230,025
4 Claims. (Cl. 220—15)

This application is a continuation of our application Serial No. 682,104, filed September 5, 1957, and now abandoned.

This invention relates to a double-walled container for holding and dispensing liquefied gases, and more particularly to containers for carrying liquid oxygen in aircraft.

Liquid oxygen containers are usually constructed with double walls, the space between the inner and outer walls being provided to insulate the liquid oxygen in the inner vessel from the atmospheric heat. This is necessary because liquid oxygen boils at approximately −183° C., and without high quality insulation such oxygen would vaporize very quickly. The weight and space advantages of storing oxygen as a low pressure liquid instead of a high pressure gas are well known. These advantages are particularly significant when the oxygen is to be stored in aircraft for high altitude breathing purposes.

Supporting a liquid oxygen vessel within the outer casing presents unusual problems when the containers are intended for aircraft service. The apparatus must be constructed so that the inner vessel is adequately supported in spaced relation to the outer casing when the apparatus is turned in any position, and the supporting means must resist the forces of acceleration and vibration in any direction. In other words, the inner vessel support system must resist vertical and lateral movement and combinations thereof within the outer casing. At the same time, the supporting means should transfer as little atmospheric heat to the inner vessel as possible. Other requirements of a suitable support system are minimum weight, small space, ease of assembly and minimum air leak possibilities.

A principal object of the invention is to provide an improved aircraft liquid oxygen container having the characteristics of light weight, minimum heat leak, compactness, and structural stability to acceleration and vibration in all directions.

A further object is to provide a support system for a double-walled liquid oxygen aircraft container having the characteristics of light weight, minimum heat leak, compactness, ease of assembly and prevention of inner vessel movement within the outer casing under severe vibration or acceleration conditions.

These and other objects of the invention will in part be obvious and in part become apparent from the ensuing description and appended claims.

In accordance with one embodiment of the present invention, a double-walled container is provided with a liquid oxygen holding inner vessel and an outer casing with an insulating jacket therebetween. At least two opposingly positioned outer compression members are placed in the insulating jacket with opposite ends of each member against the outer wall of the inner vessel, and the inner wall of the outer casing respectively. These members, which are preferably hollow plastic tubes, serve to resist all relative movement of the inner vessel within the outer casing. Since the inner vessel is in axial compression and the outer casing is in axial tension, the outer members are kept in a state of substantial compression at all times. The outer compression members are preferably substantially vertically positioned with opposite ends of each in depressions in the outer wall of the inner vessel and in the inner wall of the outer casing. The depressions serve to substantially prevent relative sliding movement between the ends of the outer compression members and the walls of the insulating jacket. Furthermore, a compression column may be positioned within the inner vessel to support such vessel against the forces exerted by the outer compression members. The ends of the compression column are positioned against the inner walls of the inner vessel, preferably at points substantially opposing the outer compression members. A capacitance-type probe comprising at least two capacitor plates with a space therebetween for the liquid oxygen dielectric, may be provided to monitor the liquid oxygen level in the inner vessel. If such a probe is used, the compression column may comprise at least one of the capacitor plates.

Figure 1:
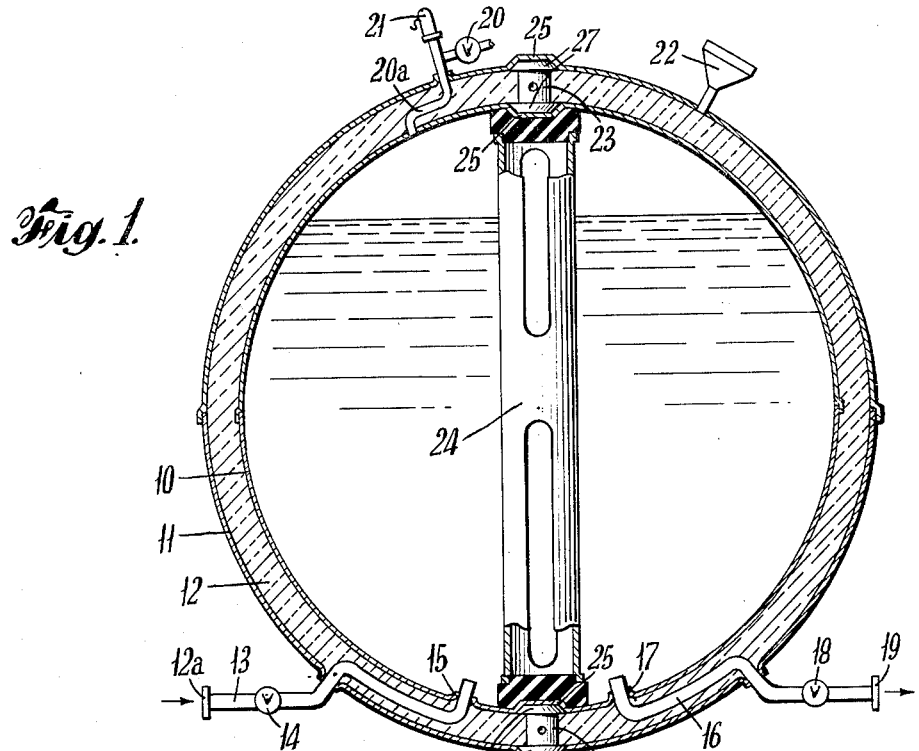
FIGURE 1 is a view, mainly in vertical cross-section, of an exemplary double-walled container construction embodying the invention.

Referring more specifically to FIGURE 1, the double-walled container includes a liquefied gas holding inner vessel 10 which is preferably spherical in form since this shape provides the largest volume for a given weight of metal. The inner vessel 10 is completely surrounded by a heat insulating means or jacket having a casing 11 which is spaced from the inner vessel to provide an insulating space 12. This space 12 is preferably evacuated and filled with a suitable heat insulating material. Alternatively the space may be evacuated to a relatively higher degree and the inner wall of the casing 11 and the outer wall of the inner vessel 10 may be provided with a high polish. Liquefied gas is charged into the inner vessel 10 through a coupling means 12a, conduit 13 and regulating valve 14, therein, the conduit 13 being leak tightly connected to vessel 10 through a hole 15 therein. Liquefied gas may be withdrawn from the inner vessel 10 through conduit 16 which is leak tightly connected to vessel 10 through a hole 17 therein. The liquefied gas withdrawal is controlled by regulating valve 18. The withdrawn liquefied gas is passed through conduit 16 and coupling means 19 to suitable vaporizing and dispensing means (not shown). A filling vent valve 20 communicates with the upper part of the inner vessel 10 by means of conduit 20a to vent gas from such vessel during the filling operation, and relief valve 21 serves to vent gas in the event of excessive pressure buildup during the liquefied gas holding period. A safety head 22 is connected to the insulating space 12 to relieve pressure in such space in event of accidental leakage from the inner vessel 10.

The inner vessel 10 is supported and stabilized against all relative movement (both vertical and lateral) within the outer casing 11 by non-metallic members 23 which are in compression with opposite ends against the outer wall of the inner vessel 10 and the inner wall of the casing 11 respectively. Inner compression column assembly 24 may be provided inside inner vessel 10 to support it against forces exerted by the outer compression members 23. The outer compression members 23 are preferably positioned in depressions 25 in the outer wall of inner vessel 10 and the inner wall of the casing 11. The use of such depressions provides several advantages as compared to positioning the outer compression members directly against the undepressed and curved surfaces of the inner vessel 10 and casing 11. They provide a convenient means of substantially preventing relative sliding movement between the outer members 23, and the inner vessel 10 and outer casing 11. Another advantage of the depressions is reduction of the heat transfer through the members 23. Heat is transferred from the atmosphere to the inner vessel 10 by means of member 23, and this transfer may be substantially reduced by increasing the length of the heat transfer path, which results from the use of depressions since the members 23 of necessity must be longer. Also, the use of the depressions provides a more stable and easily assembled support system. Other means could be used to prevent the relative sliding movement, such as projections extending from either wall into the insulating jacket 12 in contact with the outer compression members 23. These members could also be attached to the walls of the insulating jacket. However, these arrangements do not permit reduction of the heat transfer rate, which is one of the chief advantages of the depression embodiment of the invention.

It has been found preferable to place the members 23 in a substantially concentric vertical position around the vertical centerline of the inner vessel 10 so as to transfer all of the inner vessel weight directly to the lower compression member 23 and minimize lateral stresses in the casing 11. Another advantage of the vertical mounting arrangement is that a single member may be used both as the inner compression column and a liquid level capacitance-type probe, as discussed below in detail. However, the present invention is not limited to vertically mounted members 23. For example, the axis of these members could be inclined so as to reduce the overall height of the container if suitable means are provided to resist the inward thrust on inner container 10.

The conventional practice would be to use metal supports for members 23. According to the present invention, certain organic plastics have been found preferable for the outer members 23 because of their more favorable strength-to-heat conductivity ratio. Also, in small containers, metal supports would of necessity be designed with such thin walls that elastic stability would be a problem. Materials useful for outer members 23 should have the properties of relatively high compression and shear strengths, low thermal conductivity, and retention of such properties at temperatures from about −183° C. to 127° C. Compositions having these properties include laminated phenolic plastics (e.g. phenol formaldehyde), melamine resins (e.g. melamine formaldehyde), and trifluorochloroethylene, all of these materials being preferably reinforced with glass fiber or other suitable high-strength filler material.

Figure 2:
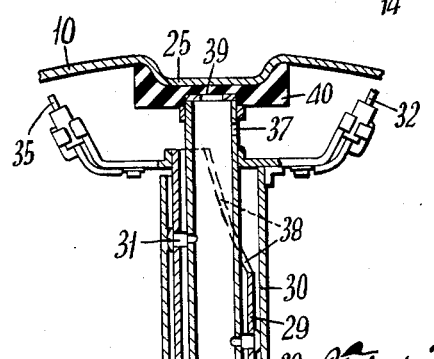
FIGURE 2 is a longitudinal sectional view on an enlarged scale of the outer compression member employed in the container of FIGURE 1.
Figure 2:
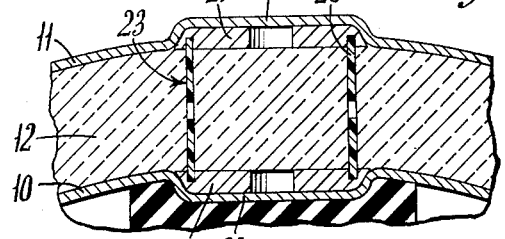

Referring now to FIGURE 2, the compression member 23 preferably consists of glass fiber reinforced plastic tube 26 which is cemented at either end in slots of metal disks 27. These disks may be cemented to the container walls to assist the axial forces in resisting tipping motion. Although such disks are not essential, they provide a method of reducing the stress concentrations on the ends of the plastic tube 26. This is especially desirable for aircraft service since it provides a high structural resistance to vibration.

The liquid container support system of the present invention is assembled by first temporarily attaching the members 23 to the top and bottom of the inner vessel 10 and then placing such vessel in the lower segment of the outer casing 11. Next, the two segments of the outer casing are elastically elongated, and such segments are girth welded together. This places the outer casing 11 in axial tension, and since the inner vessel is in axial compression, the members 23 are kept in a state of substantial compression at all times. In this manner, members 23 provide resistance to tipping due to lateral forces even when the vessel is filled with liquefied gas and shrinks due to the low temperature. Thus, in the present support system, the elastic deformation of the inner vessel 10 and the outer casing 11 are relied upon to maintain the supports 23 in compression and compensate for shrinkage of the inner container 10 or expansion of the outer casing 11 due to temperature differences.

It can be seen from the foregoing description that each outer compression member 23 resists lateral forces as well as vertical forces; that is, the same supports resist acceleration forces in all directions. This is an extremely desirable characteristic because the combined requirements of minimum total cross sectional area for supports to minimize heat leak, adequate strength, and resistance to acceleration forces in all directions discourage the use of supports which exert a holding force only in one direction.

The outer compression members 23 of course exert inward pressure on the walls of the inner vessel 10, and unless compensating means are provided this vessel may collapse if it is relatively thin. In a container having an inner vessel designed for a high working pressure the walls can be made thick enough so that the use of additional supports may be dispensed with. Also, if the container were intended for stationary use where acceleration and vibration forces are low, the stresses on the inner vessel would be minimized. However, the forces on the inner container of an aircraft liquid oxygen container are relatively high, and the preferred embodiment of the present invention utilizes inner compression column 24 as a co-operating element support. Inner column 24 is preferably vertically mounted, and has opposite ends positioned against the inner wall of the inner vessel 10 at points substantially over the outer compression members 23. Such ends are preferably contoured so as to fit against the inner vessel depressions 25.

Figure 3:
FIGURE 3 is a longitudinal sectional view on an enlarged scale of an inner compression column, capacitance-type probe assembly which may be employed in the container of FIGURE 1.
Figure 3:
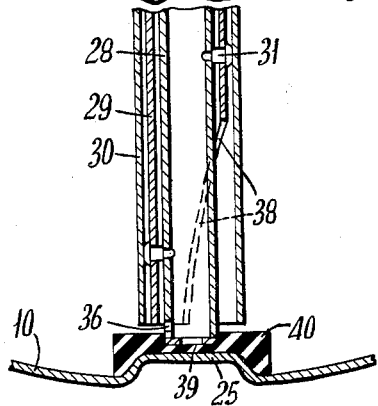

The inner compression column 24 offers another advantage in that it can be used as a combination capacitor plate and support means for a liquid level capacitance-type probe. Referring now to FIGURE 3, the inner-compression column-liquid level probe assembly 24a which may be substituted for the inner compression column 24 of FIGURE 1 includes three concentric tubes, the inner tube being the compression column 28 which supports the assembly. The middle tube 29 and outer tube 30 are separated by insulating spacers 31 to provide a constant width spacing therebetween. This assembly is in effect, a three-plate capacitor with the tubes 28, 29 and 30 acting as capacitor plates which are separated by the liquefied gas dielectric. Electrical lead 32 is connected to the inner compression column 28 and the outer tube 30, respectively, to comprise one side of the capacitor. Electrical lead 35 is connected to the middle tube 29 to form the other side of the capacitor. Leads 32 and 35 are externally connected to electrical means (not shown) for measuring the change in capacitance as the liquefied gas level varies. Holes 36 and 37 in the lower and upper ends respectively of the inner compression column 28, and angular open ends 38 of the middle tube 29 permit adequate circulation of the liquefied gas dielectric throughout the assembly 24a. The ends of the inner compression column 28 fit in recesses 39 in plastic end supports 40, which in turn fit over the inner vessel depressions 25 as previously described. The plastic end supports 40 electrically insulate the probe assembly 24a from the inner vessel 10 as well as hold the assembly in place.

Figure 4:
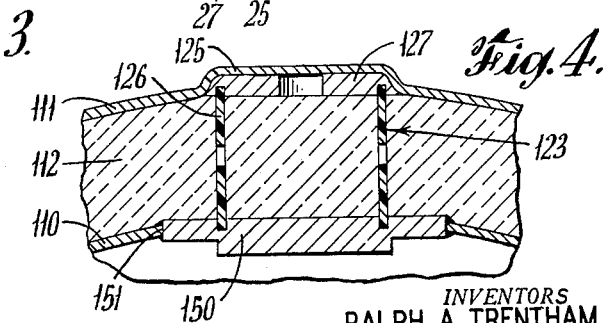
FIGURE 4 is a longitudinal sectional view on an enlarged scale of an alternate outer compression member assembly.

FIGURE 4 illustrates an alternate outer compression member assembly in which the plastic tube 126 is cemented at one end in a slot of metal disk 127, and in a slot of metal insert 150 at the other end. The metal insert 150 fits in a hole 151 of inner vessel 110, and is bonded to the walls thereof. The metal disk 127 fits in a depression 125 in the wall of the outer casing 111 in the pre-described manner.

The invention is not limited to the exact details of construction disclosed herein and it will be now apparent to

What is claimed is:

1. In a double-walled container having a low-boiling liquefied gas holding inner vessel and an outer casing with an insulating jacket therebetween; the improvements comprising at least two opposingly positioned outer compression members in said insulating jacket, such members being substantially vertically positioned with opposite ends against the outer surface of the inner vessel and the inner surface of said outer casing respectively, and serving to resist vertical and lateral movement of said inner vessel within said outer casing; a compression column inside said inner vessel having opposite ends positioned against the inner surface of said inner vessel at points substantially opposing said outer compression members, such column serving to support the inner vessel against the pressure exerted by the outer compression members; and a capacitance-type probe for monitoring the liquid level of said liquefied gas in the inner vessel, such probe comprising at least two capacitor plates with a space therebetween for the liquefied gas dielectric, said compression column comprising one of said capacitor plates.

2. In a double-walled container having a low-boiling liquefied gas holding inner vessel and an outer casing with an insulating jacket therebetween; the improvements comprising at least two opposingly positioned hollow plastic outer members in said insulating jacket, such members being substantially vertically positioned with opposite ends in depressions in the outer surface of the inner vessel and the inner surface of said outer casing respectively, such outer members serving to resist relative movement of said inner vessel within said outer casing, the inner vessel being in sufficient axial compression and the outer casing being in sufficient axial tension when the container is empty so as to utilize such elastic deformations of the vessel and casing to maintain the opposingly positioned outer members in a rigid state of substantial compression when said inner vessel contracts due to filling with cold liquefied gas; a compression column inside said inner vessel with opposite ends positioned against the inner surface of said inner vessel at points substantially over the inner vessel outer surface depressions holding the ends of the outer compression members, such column serving to support the inner vessel against the pressure exerted by the outer members; and a capacitance-type probe for monitoring the liquid level of said liquefied gas in the inner vessel, such probe comprising at least two capacitor plates with a space therebetween for the liquefied gas dielectric, said compression column comprising one of said capacitor plates.

3. A light weight double-walled container for storing low-boiling liquefied gas comprising an inner vessel, at least two opposingly positioned hollow plastic compression members having one end positioned against the outer surface of said inner vessel; a substantially elastically elongated outer casing consisting of a lower segment and an upper segment joined together in a girth joint and having one depression in the inner surface of each of said segments, such depressions being diametrically opposed and engaging the other end of said hollow plastic compression members; and said substantially elastically elongated outer casing at all times tending to return to its normal size so as to continually urge said hollow plastic compression members against said inner vessel thereby transmitting diametrically opposed compression forces to said inner vessel and said inner vessel reacts to such compression force to transmit tension forces to said outer casing whereby movement in all directions of said inner vessel within said outer casing is prevented.

4. A light weight double-walled container for storing low-boiling liquefied gas comprising an inner vessel having diametrically opposed depressions in the outer surface thereof; two opposingly positioned hollow plastic compression members, the first member having one end positioned in one depression and the second member having one end positioned in another diametrically opposed depression in said inner vessel; a substantially elastically elongated outer casing consisting of a lower segment and an upper segment joined together in a girth joint and having a depression in the inner surface of each of said segments, such depressions being diametrically opposed and being in axial alignment with the depressions in said inner vessel, said depressions in the outer casing engaging the other ends of said hollow plastic compression members and said substantially elastically elongated outer casing at all times tending to return to its normal size so as to continually urge said hollow plastic compression members against said inner vessel thereby transmitting diametrically opposed compression forces to said inner vessel whereby such system of forces prevents movement in all directions of said inner vessel within said outer casing.

References Cited by the Examiner

UNITED STATES PATENTS

| 2,729,357 | 1/56 | Nason et al. | 220—15 |
| 2,799,425 | 7/57 | Werker | 220—15 |
| 2,874,865 | 2/59 | Canty et al. | 220—15 |

FOREIGN PATENTS

| 207,711 | 4/57 | Australia. | |

THERON E. CONDON, *Primary Examiner.*

EARLE J. DRUMMOND, *Examiner.*